Figure 1:
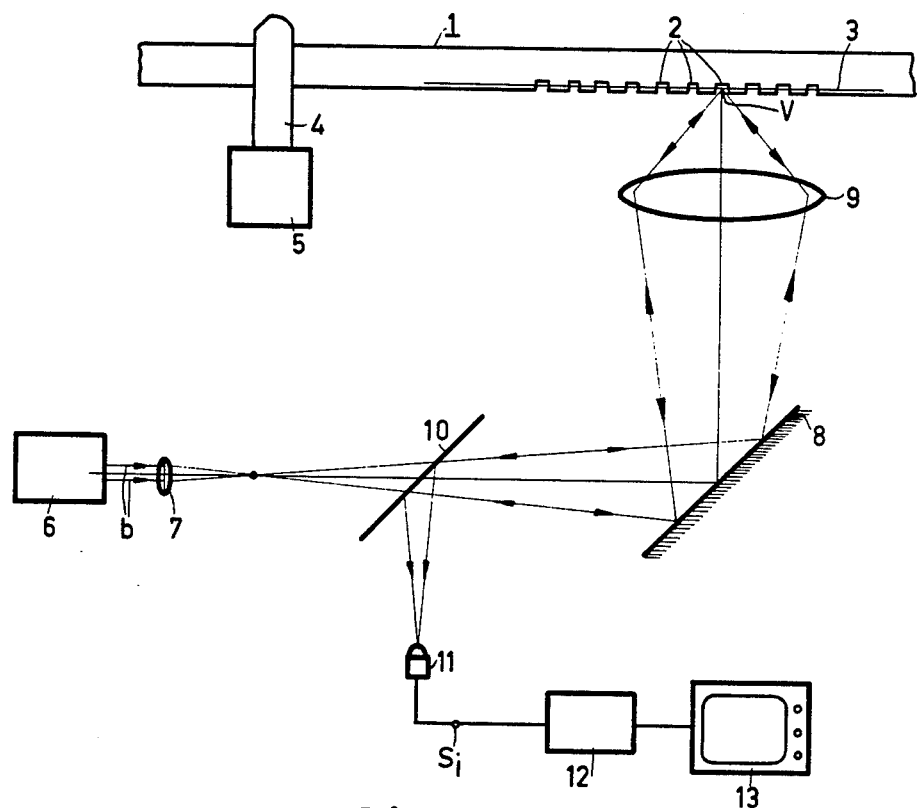

United States Patent [19]

Bouwhuis

[11] 4,242,579
[45] Dec. 30, 1980

[54] APPARATUS FOR THE POINTWISE SCANNING OF AN INFORMATION SURFACE

[75] Inventor: Gijsbertus Bouwhuis, Eindhoven, Netherlands

[73] Assignee: U.S. Philips Corporation, New York, N.Y.

[21] Appl. No.: 925,230

[22] Filed: Jul. 17, 1978

[30] Foreign Application Priority Data

May 11, 1978 [NL] Netherlands .......... 7805069

[51] Int. Cl.$^3$ .................................. G01J 1/20
[52] U.S. Cl. .................... 250/201; 179/100.1 G
[58] Field of Search .............. 250/201, 204, 570, 208, 250/209; 358/128; 179/100.3 V, 100.3 G

[56] References Cited

U.S. PATENT DOCUMENTS

| | | | |
|---|---|---|---|
| 4,006,293 | 2/1977 | Bouwhuis et al. | 179/100.3 V |
| 4,051,527 | 9/1977 | Braat | 358/128 |

*Primary Examiner*—David C. Nelms
*Attorney, Agent, or Firm*—Thomas A. Briody; William J. Streeter; Simon L. Cohen

[57] ABSTRACT

An apparatus is described for the pointwise scanning of an information surface. By arranging an observation objective system asymmetrically relative to a zero-order subbeam of the radiation coming from the information surface, and by utilizing a detector whose dimension in the scanning direction is small, the resolution can be increased.

3 Claims, 7 Drawing Figures

APPARATUS FOR THE POINTWISE SCANNING OF AN INFORMATION SURFACE

The invention relates to apparatus for the pointwise scanning of an information surface, in particular to apparatus for reading a record carrier with an optically readable information structure. The apparatus comprises a radiation source, an illumination objective system for focussing the scanning beam emitted by the radiation source to a scanning spot on the information surface, and an observation objective system for concentrating radiation coming from the information surface on the plane of a radiation-sensitive detection system.

Such apparatus, intended for reading a round disc-shaped and radiation-reflecting record carrier on which a television program is stored, in inter alia described in: "S.M.P.T.E. Journal" November 1976, Vol. 85, pages 881–886. The information structure comprises track-wise arranged areas which have a different optical property than the rest of the information surface. The information may be contained in the spatial frequency of the areas and, as the case may be, the lenghts of the areas.

During reading the information structure is illuminated with a radiation spot which is larger than the areas, so that diffraction occurs. The information structure splits the scanning beam into a non-diffracted zero-order subbeam and a number of diffracted higher-order subbeams.

If the record carrier is read in the reflection mode, as is shown in FIG. 25 of the cited publication, the objective system which forms the scanning spot on the information structure also constitutes the objective system which concentrates the radiation which has been reflected by the information structure on a detector. The pupil of this objective system is symmetrically disposed relative to the zero-order subbeam. The maximum spatial frequency of the information structure which can still be read is dictated by the resolution of the objective system. In the case of reading in the reflection mode using a focussed read beam, the maximum spatial frequency $f_c$, referred to hereinafter as: conventional cut-off frequency, is given by: $2 \cdot N.A./\lambda$, in which N.A. represents the numerical aperture of the objective system and $\lambda$ the wavelength of the read beam.

For reading a record carrier with a playing time of thirty minutes, which is rotated at 25 revolutions per second and whose radial period of the track structure is 1.7 $\mu$m, the period of the information areas being of the order of 1 $\mu$m, a helium-neon laser is used as radiation source, with $\lambda = 0.6328$ $\mu$m. An objective system with an N.A. $= 0.4$ should then be used. An objective system with such a comparatively large numerical aperture is rather expensive and, which is more important, has a comparatively small depth of focus of for example 4 $\mu$m. In that case stringent requirements should be imposed on the servo system which has been provided in the scanning apparatus for maintaining the scanning beam in focus on the information surface.

It has also been proposed to read a record carrier with the aid of a semiconductor diode laser, for example as AlGaAs diode laser, which emits radiation having a wavelength of the order of 0.88 $\mu$m. If by means of such a diode laser the same resolution is to be obtained as with a helium-neon laser, an objective system with a larger numerical aperture for example with N.A. $= 0.55$, and thus with a smaller depth of focus is to be used.

In the last-mentioned case it would be attractive if the numerical aperture of the objective system could be reduced, while maintaining the resolution.

In other cases, where a comparatively large numerical aperture presents no serious problem, it would be attractive if the resolution could be increased, while maintaining the numerical aperture of the objective system.

Meeting the said requirements is not only of importance when scanning coded information which is contained in an optical structure of a record carrier, but is generally of importance in those cases where optical information is scanned pointwise and is converted into an electrical signal, which is to be reproduced at a different instant or a different location. Examples of this are facsimile devices or devices by means of which optical representations or documents are converted into television signals.

It is the object of the present invention to provide a scanning apparatus which complies with one of the said requirements or a combination of the two requirements. The apparatus in accordance with the invention is therefore characterized in that the observation objective system is disposed asymmetrically relative to a zero-order subbeam of the radiation coming from the information surface, and that the detection system is constituted by a detector whose dimension in the scanning direction is small.

The method of information scanning in the apparatus in accordance with the invention differs from that employed in the apparatus as described in "S.N.P.T.E. Journal", vol. 85, pages 881–886 in two respects. In the last-mentioned apparatus the observation objective system is symmetrically illuminated by the zero-order subbeam, and the total radiation energy which enters the objective system is detected. In the apparatus in accordance with the invention the observation objective system is asymmetrically illuminated by the zero-order subbeam and only a small portion of the radiation energy coming from the information surface and entering this objective system is detected.

In addition to the total zero-order subbeam, parts of the first-order subbeams enter the observation objective system in the known apparatus. In the pupil of the objective system parts of the first-order subbeams overlap the zero-order subbeam. Use is made of the effect that the total radiation energy which passes through the objective system and which is detected by the detector varies during scanning. The variation results from the fact that the phases of the first order subbeams change relative to those of the zero-order subbeam. This variation can be detected as long as the first-order subbeams interfere with the zero-order subbeam within the pupil of the observation objective system. If the spatial frequency of the information structure is so high that the first-order subbeams fall just outside the pupil, so that no longer any interference occurs in the pupil, the total radiation energy which is incident at the detector will no longer vary during scanning and the information can no longer be read. The conventional cut-off frequency is then reached.

The invention is based on the recognition that in addition to the above-mentioned effect a second effect occurs, namely that the interference pattern of a first-order subbeam and the zero-order subbeam "travels," during scanning, i.e. that the intensity distribution in the plane of the detector varies in time. This variation can be detected with a narrow detector, whose width is of the order of half a period of the interference pattern. A first-order subbeam and the zero-order subbeam then need no longer overlap in the pupil of the observation objective system, but these subbeams may pass through different parts of said pupil so as to be combined in the plane of the detector where, owing to the coherence of the scanning beam, an interference pattern is produced. It is then possible to shift the observation objective system in the direction in which one of the first-order subbeams is diffracted, so that also at spatial frequencies higher than the conventional cut-off frequency this subbeam still falls partly within the pupil of the observation objective system and can be made to interfere with the zero-order subbeam.

If the information structure is a radiation transmitting structure a separate illumination objective system and a separate observation objective system are employed.

Preferably, the information structure of a record carrier is a radiation-reflecting structure. In the case of a suitably oblique incidence of the scanning beam on the information structure, it is then also possible to employ a separate illumination objective system and a separate observation objective system. Then either the resolution can be increased substantially, while maintaining the numerical aperture of the illumination objective system, or the numerical aperture of the last-mentioned system can be reduced substantially, while maintaining the resolution.

However, a preferred embodiment of an apparatus in accordance with the invention is characterized in that the illumination objective system and the observation objective system are constituted by one objective system whose optical axis makes an acute angle with the normal to the information plane.

The advantage of this apparatus is that it is simple and that the reflected scanning beam largely traverses the same optical elements as the scanning beam emitted by the radiation source, so that vibrations of the optical elements in the radiation path have virtually no effect on the resulting signal.

In order to increase the signal-to-noise ratio of the resulting signal the apparatus in accordance with the invention may further be characterized in that further detectors are arranged on both sides of the detector in the scanning direction. The further detectors are each offset relative to the central detector and relative to each other by a distance equal to approximately half the period of the interference pattern.

Figure 2:
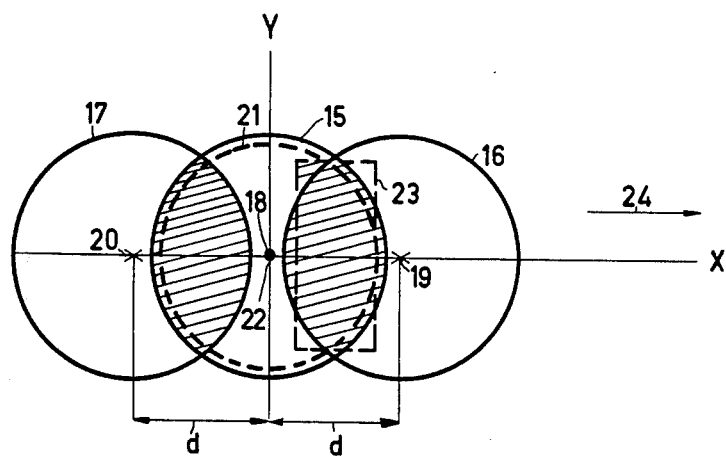
Figure 3:
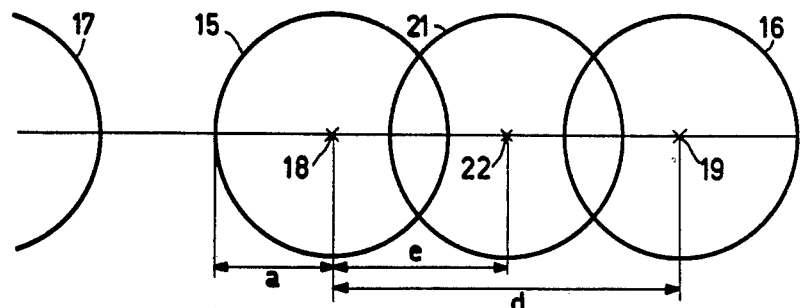
Figure 4:
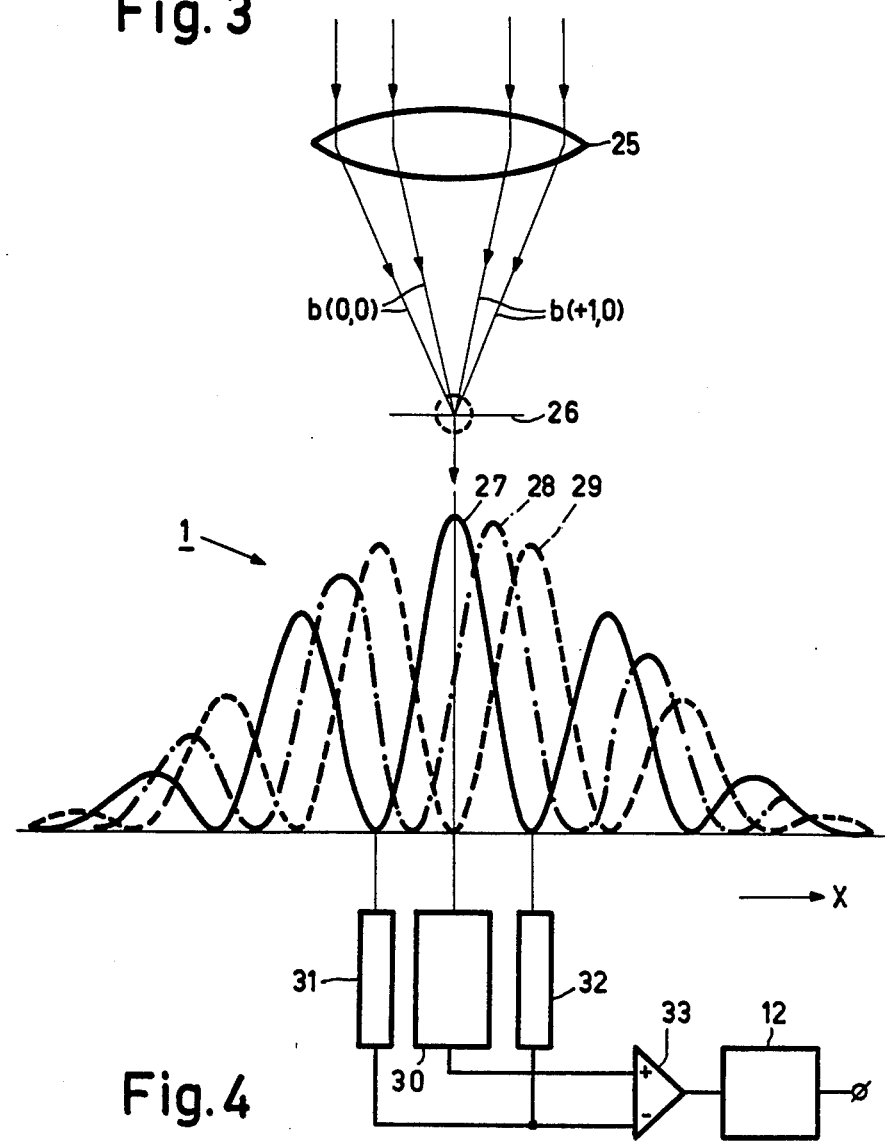
Figure 5:
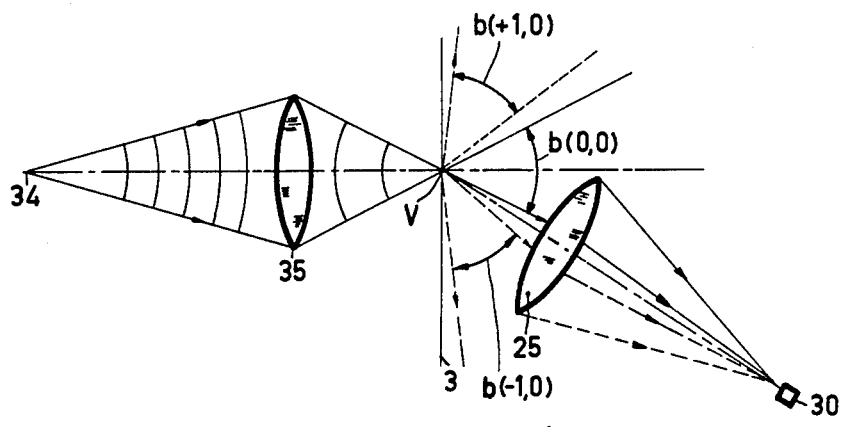
Figure 6:
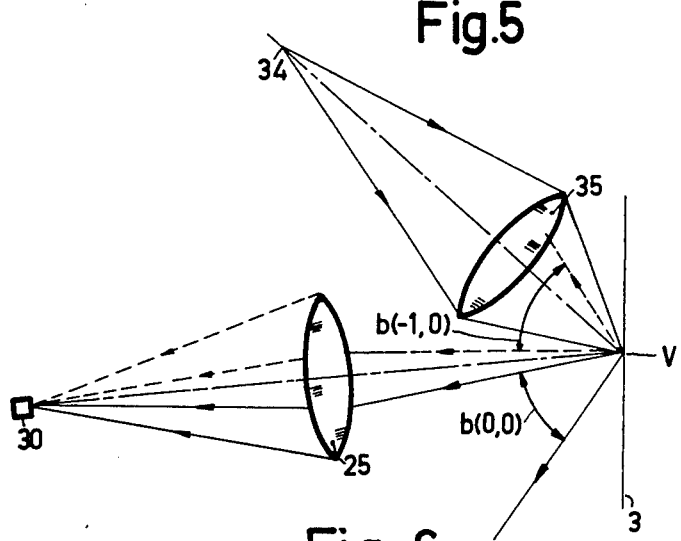
Figure 7:
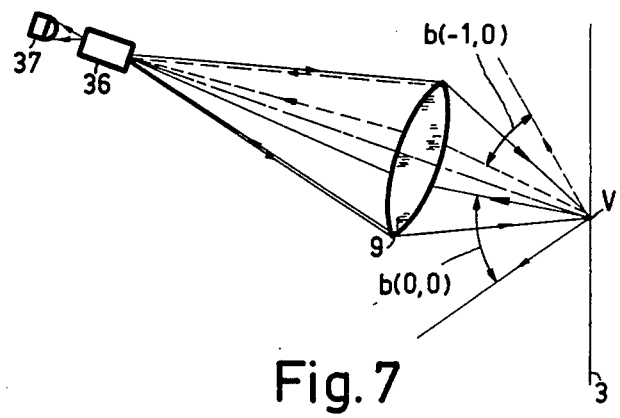

The invention will now be explained by describing apparatus for reading a round disc-shaped record carrier in which the invention is used. For this reference is made to the drawing. In the drawing:

FIG. 1 shows a previously proposed apparatus for reading a record carrier with a radiation-reflecting information structure, FIG. 2 illustrates the disposition of the subbeams of different orders relative to the pupil of the observation objective system in the apparatus in accordance with FIG. 1, FIG. 3 illustrates the disposition of the subbeams of different orders relative to the pupil of the observation objective system in an apparatus in accordance with the invention, FIG. 4 illustrates the principle of the invention, FIG. 5 shows an apparatus in accordance with the invention for reading a radiation-transmitting information structure, and FIGS. 6 and 7 show a first and a second embodiment of an apparatus in accordance with the invention for reading a radiation-reflecting information structure.

FIG. 1 shows a round disc-shaped record carrier 1 in radial cross-section. The tracks 2 of the reflecting information surface 3, which tracks comprise information areas, not shown, extend perpendicularly to the plane of drawing. The information structure may be an amplitude structure, the information areas having a different coefficient of reflection than the rest of the surface 3. However, the information structure may alternatively be a phase structure, as is shown in FIG. 1, the information areas being constituted by pits in the surface 3.

During scanning the record carrier is rotated with the aid of a spindle 4 which is driven by a rotary motor 5. A radiation source 6, for example a helium-neon laser or a semiconductor diode laser, produces a scanning beam b. A mirror 8 reflects this beam to an objective system 9, which is schematically represented by a single lens. In the path of the beam b an auxiliary lens 7 is included, which ensures that the pupil of the objective system is filled in an optimum manner. Then a scanning spot V of minimum size is formed on the information structure.

The scanning beam is reflected by the information structure and, as the record carrier rotates, is modulated in accordance with the sequence of the information areas in a track being read. By radially moving the scanning spot and the record carrier relative to each other by means known per se and not shown, the entire information surface 3 can be scanned.

The modulated scanning beam again traverses the objective system 9 and is reflected by the mirror 8. The radiation path includes means for separating the modulated and the unmodulated scanning beam. These means may for example comprise a polarization-sensitive splitter prism and a $\lambda/4$ plate. For the sake of simplicity it has been assumed that in FIG. 1 the said means consist of a semitransparent mirror 10. This mirror reflects the modulated scanning beam to a radiation-sensitive information detector 11. The output signal $S_i$ of this detector is modulated in accordance with the information being scanned and can be applied to a demodulator 12 in which the signal is processed and rendered suitable for reproduction with for example a television set 13.

The part of the information surface in the vicinity of the scanning spot V behaves as a two dimensional diffraction grating, which splits the incident scanning beam into an undiffracted zero-order subbeam and diffracted first-order subbeams and higher-order subbeams. The zero-order subbeam and parts of the diffracted subbeams again enter the objective system 9. In the plane of the exit pupil of the objective system the centers of the various subbeams are spaced from each other. FIG. 2 shows the situation in this plane.

The circle 15 with the center 18 represents the cross-section of the zero-order subbeam in this plane. The circles 16 and 17 with the centers 19 and 20 represent the cross-sections of the tangentially diffracted $(+1,0)$ and $(-1,0)$ order subbeams. The X-axis and the Y-axis in FIG. 2 correspond to the tangential direction, or the scanning direction, and the radial direction, or the direction transverse to the scanning direction, in the information plane 3. Since only tangentially diffracted subbeams are of interest for the present invention, the radially diffracted subbeams will not be considered.

In FIG. 2 the dashed circle 21 represents the pupil of the objective system 9. For the situation shown in FIG. 1 the zero-order subbeam fills the pupil entirely, so that in reality the circles 15 and 21 coincide. Only that part of the radiation coming from the record carrier which falls within the pupil is used for information scanning. For the purpose of scanning use is made of the phase variations in the (+1,0) and (−1,0) order subbeams relative to the zero-order subbeam.

In the hatched areas in FIG. 2 said first-order subbeams overlap the zero-order subbeam and interference occurs. The phases of the first-order subbeams vary if the scanning spot moves relative to an information track. As a result of this the intensity of the total radiation passing through the exit pupil of the objective system varies.

When the center of the scanning spot coincides with the center of an information area (−or pit) a certain phase difference $\psi$ exists between a first-order subbeam and the zero-order subbeam. When the scanning spot moves from a first area to a second area, the phase of (+1,0) order subbeam increases by $2\pi$. Therefore, it may be stated that as the scanning spot moves in the tangential direction the phase of said subbeam relative to the zero-order subbeam varies with $\omega t$. Therein $\omega$ represents a time frequency which is determined by the spatial frequency of the information areas and by the speed with which the scanning spot moves over a track. The phase $\phi(+1,0)$ of the (+1,0)-order subbeam relative to the zero-order subbeam may then be represented by:

$$\phi(+1,0)=\psi+\omega t.$$

The intensity variation caused by interference of the (+1,0)-order subbeam with the zero-order subbeam could be detected by a radiation-sensitive detector 23, repesented by dashed lines in FIG. 2, which detector is disposed in the plane of the exit pupil of in an image thereof. For a specific phase depth of the information structure, for which $\psi=\pi$ rad., the intensity variation over the exit pupil is symmetrical. Then, as is shown in FIG. 1, the beam parts traversing the two areas of overlap can be concentrated on one detector. The time dependent output signal of the detector 11 may then be represented by:

$$S_i=A(\psi)\cdot\cos\psi\cdot\cos\omega t,$$

where $A(\psi)$ decreases at decreasing value of $\psi$. For a specific phase depth of the information structure the amplitude $A(\psi)\cdot\cos\psi$ is constant. The frequency of the signal $S_i$ is then given by the information which is instantaneously scanned.

So far only the first-order subbeams have been discussed. It is obvious that the information structure will also diffract radiation to higher orders. The radiation energy in the higher diffraction orders is low and the diffraction angles are so large at the high spatial frequencies of the information structure considered here, that only a small part of the higher order beams falls within the pupil of the objective system 9. Therefore, the influence of the higher-order subbeams may be neglected.

The optical scanning system outlined in the foregoing has a certain cut-off frequency $f_c$. The distance d between the center 22 of the pupil of the objective system 9 and the centers 19 and 20 of the first-order subbeams is determined by: $\lambda\cdot f$, where f represents the spatial frequency of the information areas in the scanning direction. FIG. 2 represents the situation in which the frequency f is slightly higher than half the cut-off frequency $f_c$. If the frequency f increases, the (+1,0)-order subbeam moves to the right and the (−1,0)-order subbeam moves to the left, and the distance d increases. For a given value of f, referred to as the conventional cut-off frequency $f_c$, the circles 16 and 17 no longer intersect the circle 21, but are merely tangent to this circle. The first-oder subbeams then no longer pass through the pupil of the objective system 9, and these beams can no longer be made to interfere with the zero-order subbeam in the pupil. The information of the record carrier can then no longer be scanned by detecting the total radiation energy which passes through the pupil of the objective system.

For the situation illustrated in FIG. 1 where only one objective system is provided which serves as illumination objective and as observation objective, the conventional cut-off frequency is given by:

$$f_c=2\,\text{N.A.}/\lambda$$

If, as in the case of scanning a radiation-transmitting record carrier, a separate illumination objective and a separate observation objective are provided the cut-off frequency is given by:

$$f_c=(\text{N.A.}_v+\text{N.A.}_w)/\lambda$$

where $\text{N.A.}_v$ and $\text{N.A.}_w$ respectively represent the numerical aperture of the illumination objective system and of the observation objective system.

In accordance with the invention the observation objective system is disposed so that the center 22 of the pupil of this objective system no longer coincides with the center 18 of the zero-order subbeam, but is shifted in the direction of the center 19 or 20 of one of the first-order subbeams. Thus, it is also achieved that at spatial frequencies which are higher than the afore-mentioned conventional cut-off frequency $f_c$ a part of a first-order subbeam still passes through the pupil of the observation objective system.

FIG. 3 represents the situation in which the pupil 21 has been shifted to the right relative to the situation in FIG. 2. The distance d between the center 18 of the zero-order subbeam and the centers 19 and 20 of the first-order subbeams, and thus the spatial frequency of the information areas is substantially greater than in the case of FIG. 2, approximately by a factor of 3. This spatial frequency is approximately 1.5 times the cut-off frequency of the system in accordance with the FIGS. 1 and 2. Nevertheless, a substantial portion of the (+1,0)-order subbeam falls within the pupil of the observation objective system. Now only a part of the zero-order subbeam enters said pupil, while the (−1,0) order subbeam falls entirely outside in the pupil.

As is shown in FIG. 4, the parts of the zero-order subbeam b(0,0) and of the first-order subbeam b(+1,0) which fall within the pupil of the observation objective system 25 are concentrated on the detection plane 26. Since the scanning beam is a coherent beam, the radiation parts will interfere with each other in the plane 26, so that an intensity pattern I is produced which varies in the X direction as is represented by the curves 27, 28 and 29 in FIG. 4. The uninterrupted curve 27 represents the intensity variation where the scanning spot is situated exactly above the center of an information area. If the scanning spot moves away from this center to a subsequent information area, the intensity pattern for two consecutive instants will have a variation in accordance with the dash-dot curve 28 and the dashed curve 29 respectively. During scanning the intensity pattern thus "travels" over the detection plane. For a narrow detector having a fixed location, such as the detector 30 in FIG. 4, the radiation intensity which is received consequently varies during scanning. Thus, the output signal of this detector varies depending on the information being read instantaneously.

The width of the detector 30 should be small relative to the period of the intensity pattern. The period of the intensity pattern is determined by the local spatial period of the information details in the information surface to be scanned. For a specific information structure in a record carrier to be scanned or for other documents or optical representations to be scanned the spatial frequencies are known. The width of the detector 30 can then be adapted accordingly.

The signal from the detector 30 may be applied directly to a demodulator 12, in a similar way as in FIG. 1. The signal/noise ratio of the read-out signal can be improved by arranging two detectors 31 and 32 on both sides of the detector 30 and at a distance of approximately half the period of the intensity pattern. The output signals of these detectors may then be combined and subtracted from the signal from the detector 30 in a differential amplifier 33. The output of this amplifier, in its turn, is connected to the input of a demodulator 12.

In the apparatus in accordance with the invention the observation objective system is illuminated obliquely, or asymmetrically, by the zero-order subbeam. A parameter s may be introduced which is a measure of the offset, measured in the plane of the pupil of the observation objective system, of the center 22 of this pupil relative to the center 18 of the zero-order subbeam. The parameter s may be defined as this offset e normalized with the pupil radius a, see FIG. 3. For a symmetrical illumination of the pupil, as in FIG. 2, s=0. For the situations shown in FIGS. 3 and 4 s=1.5.

The cut-off frequency $f'_c$ of a scanning apparatus with oblique illumination of the observation objective system is given by:

$$f_c' = \frac{N.A._v + N.A._w}{\lambda} (1 + \frac{s}{2})$$

for s<2. For s=1.5 and $N.A._v = N.A._w$, $f'_c = 3.5 \, N.A./\lambda$, i.e. 1.75 times the conventional cut-off frequency of the apparatus in accordance with FIGS. 1 and 2.

For s=2 no radiation of the zero-order subbeam traverses the pupil of the observation objective system, so that no interference can occur between the zero-order subbeam and the (+1,0)-order subbeam. If s is approximately 2, the a.c. signal produced by the detector 30 is very small. In practice an s value of approximately 1.5 is therefore selected.

FIG. 5 schematically illustrates how the invention can be realized in an apparatus for reading a radiation-transmitting record carrier. In this Figure the record carrier is represented by the information surface 3. The scanning beam from a radiation source 34 is focussed on this surface to a scanning spot V by the illumination objective system 35. Behind the information surface 3 an observation objective system 25 is disposed, whose optical axis makes an acute angle with that of the illumination objective system 35. In this Figure and in FIGS. 6 and 7 the optical axes are represented by dash-dot lines. The observation objective system intercepts part of the radiation of the subbeam b(0,0) and of the subbeam b(−1,0) and concentrates these radiation components on the plane of the detector 30, in which plane interference occurs.

FIG. 6 shows a part of an apparatus in accordance with the invention for scanning a radiation-reflecting information surface. In view of the foregoing this Figure is self-evident. The radiation components of the scanning beam which has been reflected by the information surface, which components have been made to interfere, are now spatially separated from the radiation emitted by the radiation source. In contradistinction to the apparatus in accordance with FIG. 1 no additional beam splitting means need be used.

In the apparatus in accordance with FIGS. 5 and 6 the observation objective system may have a different numerical aperture than the illumination objective system. The first-mentioned objective system now need only concentrate part of the radiation coming from the information surface on the plane of the detector 30. The depth of focus of this objective system may be smaller than that of the illumination objective system with which a small scanning spot is to be formed on the information surface. By selecting the numerical aperture of the observation objective system greater than that of the illumination objective system, the resolution of the obtical scanning system can be increased while maintaining the numerical aperture of the illumination objective system and maintaining the s-value.

FIG. 7 shows a part of an apparatus for scanning a radiation-reflecting information surface which employs only one objective system. In this apparatus the illumination objective system itself concentrates a part of the subbeam b(0,0) and of the subbeam b(−1,0) on the plane of the detector. In a similar way as in the apparatus in accordance with FIG. 1 the parts of the subbeams b(0,0) and b(−1,0) passing through the objective system 9 can be separated from the beam emitted by the radiation source by means of for example a semitransparent mirror.

The arrangement of FIG. 7 is particularly suitable to be read with a diode laser 36 as radiation source. Use can then be made of the so-called feedback effect, which effect has been described inter alia in U.S. Pat. No. 3,941,945. This feedback effect means that radiation which is reflected to the diode laser by the information surface may give rise to a further radiation emission by the diode laser under certain circumstances. The radiation emitted by the diode laser is then dependent on the intensity of the radiation reflected to the diode laser and thus on the information being scanned instantaneously. The variation in the radiation emitted by the diode laser can be detected with a detector 37 which is disposed behind the diode laser. The variation in the diode laser caused by the information being scanned can also be detected by measuring the variation in electrical resistance of the diode laser. The diode laser itself is then used as an information detector. As the aperture through which the diode laser emits its radiation is small, this diode laser constitutes a suitable detector for a scanning apparatus in accordance with the invention. As furthermore the forward path of the scanning beam is the same as the return path, the diode laser is automatically well-aligned and any vibrations of optical elements in the radiation path will not affect the detector signal.

Since a scanning apparatus in accordance with the invention makes use of the interference between the zero-order subbeam and one first-order subbeam, this apparatus is suitable for reading deep and shallow phase structures and amplitude structures.

A record carrier with an optical information structure in which for example a television program is stored is preferably provided with a so-called protective layer. This is a radiation-transmitting layer of a certain thickness, which ensures that dust particles, scratches and the like remain at a suitable distance from the optical information structure. These dust particles and the like then cannot seriously affect the read beam which has been focussed on the information structure. In the situation shown in FIG. 5 in which the illumination beam is perpendicularly incident on the record carrier, such an additional protective layer presents no additional problems. In the case of an oblique incidence of the illumination beam on the record carrier, as is the case in FIGS. 6 and 7, the protective layer may give rise to additional aberrations such as coma and astigmatism in the scanning spot. The illumination objective system can be corrected in respect of these aberrations. However, such a correction is only valid for one specific oblique position of the objective system relative to the record carrier. Care must then be taken that said oblique position is stricly maintained.

In the foregoing the invention has been described on the basis of an optical scanning apparatus. It will be evident that because of the analogy between scanning with a light beam and with an electron beam, the invention may also be utilized in an electron microscope. In such a microscope the resolution can then for example be increased, without adapting the lenses.

What is claimed is:

1. Improved apparatus for scanning an information surface with a beam of radiation, the beam and information surface moving relative to each other, in a device for reading a record carrier with an optically readable information structure, which apparatus comprises a radiation source, an illumination objective system for focussing the scanning beam emitted by the radiation source to a scanning spot on the information structure, an observation objective system for concentrating radiation coming from the information surface on the plane of a radiation-sensitive detection system, the improvement being characterized in that the observation objective system is disposed asymmetrically relative to a zero-order subbeam of the radiation coming from the information surface, the asymmetry being in the direction of one of the higher order subbeams and that the detection system is constituted by a radiation detector whose dimension in the scanning direction is small relative to the period of the radiation intensity pattern.

2. An apparatus as claimed in claim 1, wherein the illumination objective system and the observation objective system share common optical elements and have an optical axis that makes an acute angle with the normal to the information plane.

3. An apparatus as claimed in claim 1 or 2, wherein further radiation detectors are arranged on both sides of the radiation detector and spaced apart by an integral number of half periods of the radiation inytensity pattern in the scanning direction.

* * * * *